United States Patent [19]
McCormick

[11] 3,879,106
[45] Apr. 22, 1975

[54] MICROSCOPE SLIDE COVER SLIP

[75] Inventor: James B. McCormick, Hinsdale, Ill.

[73] Assignee: Pelam, Inc., Hinsdale, Ill.

[22] Filed: Apr. 11, 1973

[21] Appl. No.: 350,080

[52] U.S. Cl. .................................. 350/95; 356/246
[51] Int. Cl. .......................................... G02b 21/34
[58] Field of Search ...................... 350/95; 356/246

[56] References Cited
UNITED STATES PATENTS

| | | | |
|---|---|---|---|
| 3,141,547 | 7/1964 | Newby | 350/95 X |
| 3,447,863 | 6/1969 | Patterson | 350/95 X |
| 3,510,194 | 5/1970 | Connelly | 350/95 |
| 3,698,822 | 10/1972 | Polanyi | 356/246 |
| 3,726,764 | 4/1973 | White | 350/95 X |
| 3,745,091 | 7/1973 | McCormick | 350/95 X |

OTHER PUBLICATIONS

Davison, Article in Journal of the Optical Society of America, March 1955, p. 227.

Primary Examiner—David H. Rubin
Attorney, Agent, or Firm—Fitch, Even, Tabin & Luedeka

[57] ABSTRACT

A cover slip is provided which enables the user to quickly and easily prepare a slide for viewing through a microscope.

2 Claims, 3 Drawing Figures

PATENTED APR 22 1975　　　　　　　　　　　　　　　　　3,879,106

MICROSCOPE SLIDE COVER SLIP

This invention is directed to the art of microbiology and more particularly is directed to the microscope slides used in clinical pathology.

Of the various methods used in preparing slides for microscopic study, one of the more common is the sealed cover slip method. In this method a drop of a specimen is placed centrally on the surface of a glass slide and a cover slip is placed on the slide. The cover slip and slide are then pressed together to spread out the specimen for better viewing.

It is often desirable to fix the cover slip and slide together for ease of handling and to insure that the specimen is not disturbed. Further, it is often necessary to protect or seal the specimen from contamination or evaporation. A common method for accomplishing these ends is to adhere the slide and cover slip together with petroleum jelly. In such instances the specimen is peripherally ringed with the petroleum jelly and the slide and cover slip are pressed together; the petroleum jelly acting both as an adhesive between the slide and cover slip and as a sealant to isolate the specimen from the air.

When preparing a slide by the sealed cover slip method it is important that the correct amount of petroleum jelly be utilized to properly adhere the cover slip and the slide while spreading out the specimen. The ring of petroleum jelly should be spaced far enough from the specimen so that the specimen, when spread out, does not come in contact therewith. If the specimen were to contact the petroleum jelly, it could become contaminated or, alternately, the hydraulic pressure exerted by the specimen when compressed between the cover slip and slide could break the seal between the cover slip and the slide. If this seal is broken the slide may not possess a sufficient useful life for certain very important examinations, e.g., the examination for sickle cell traits in red blood cells.

An additional complicating factor often present when preparing microscope slides is that in many instances a reagent must be mixed with the specimen within the viewing area of the slides to enhance viewing of the specimen or cause certain reactions to occur which are indicative of the features being sought by the examiner. In normal practice the reagents are usually painted on one of the slide member surfaces prior to the members being joined together.

It is the object of the present invention to provide an improved cover slip for use in microscopic slide examinations. It is another object of the present invention to provide a microscope slide which has an airtight seal around the specimen contained therein.

These and other objects and advantages of the invention will become more apparent upon reading the following description in conjunction with the accompanying drawings of which:

Figure 1:
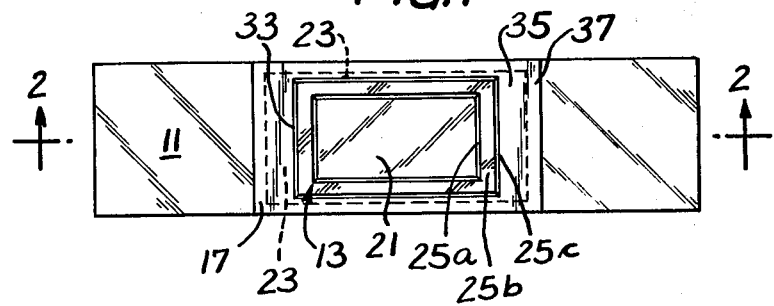
FIG. 1 is a top plan view of a microscope slide in accordance with one embodiment of the present invention.
Figure 2:
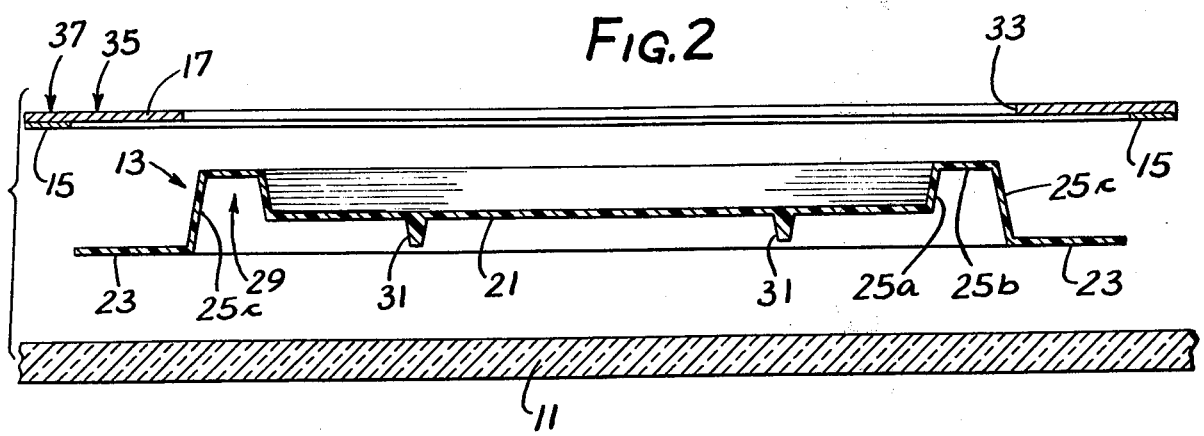
FIG. 2 is an exploded sectional view of the microscope slide of FIG. 1 taken along lines 2—2; and, FIG. 3 is a view similar to FIG. 2 of an alternative embodiment of a microscope slide with a specimen and reagent contained therein.

Referring to the drawings, there is depicted in FIGS. 1 and 2 one embodiment of a microscope slide formed in accordance with features of the present invention. The microscope slide is comprised of a glass slide 11, a transparent plastic cover slip 13, and a hold-down sheet 17 provided with an adhesive ring 15, as explained in detail hereinafter.

More particularly, the glass slide 11 is a thin, flat strip of glass and is a standard microscope slide. The slide 11 has the shape of an elongated rectangle in plan.

The cover slip 13 is comprised of a centrally positioned, generally flat transparent panel 21 which is surrounded by a peripherally extending flange 23. The flange 23 is spaced apart from and connected to the panel by a U-shaped wall 25. The flange 23 is adapted to rest flat against a surface of the slide 11 and hold the panel 21 in a parallel plane a predetermined distance above the slide surface. The space between the slide 11 and the panel 21 defines the specimen chamber and it is here that the specimen is to be located. The U-shaped wall 25 extends peripherally from the panel 21 and comprises a first wall member 25a which extends upward from the panel 21 in a generally vertical direction for a predetermined distance, a second wall member 25b which extends from the uppermost edge of wall member 25a generally horizontally outward for a second predetermined distance and a third wall member 25c which extends generally vertically downward and is connected to the flange 23. This particular channel-shaped configuration causes the horizontal portion 25b of the wall 25 to be spaced apart from the surface of the slide 11 a greater distance than the surface of the panel 21 thereby providing an overflow chamber 29 of a relatively large volumetric capacity. In alternate embodiments the overflow chamber 29 need not be channel shaped, rather the overflow chamber may be defined by a wall having a curved shape in cross-section or other configuration as long as an overflow chamber is provided between the panel 21 and the flange 23.

On the surface of the panel 21 adjacent the slide 11 there are two posts 31 each extending perpendicularly from the panel surface towards the surface of the slide 11 to terminate in a free end which is adjacent, but spaced apart from the surface of the slide 11.

The cover slip 13 is preferably made in its entirety of a transparent plastic which has sufficient flexibility in its formed state to allow the panel to be flexed toward the slide. The cover slip 13 is preferably of a uniform thickness throughout and the panel 21 is rectangular in plan.

The hold-down sheet 17 is provided with a central opening 33 allowing it to be placed over the cover slip 13, circumscribing the overflow chamber 29 with the margin 35 of the hold-down sheet 17 overlying the flange 23. The outermost portions 37 of the sheet margin 35 extend peripherally beyond the flange 23 to overlie the slide 11. In one embodiment a ring of adhesive 15 is located on the bottom surface of the outermost portions 37 of the hold-down sheet 17. When the hold-down sheet 17 is pressed against the slide 11, the sheet will become adhesively bound to the slide 11 and cause the flange 23 to be firmly fixed against the surface of the slide 11. The hold-down sheet 17 may be constructed of paper, paper-board or the like, as may be desired.

In another embodiment the adhesive ring 15 located on the outermost margin portion 37 may be extended in width to be in contact not only with the slide 11 but also be in contact with portions of the flange 23. This latter arrangement provides a particularly rigid form of adhesive attachment of the cover slip 13 to the slide 11. In either embodiment the adhesive 15 forms a very effective airtight seal between the flange 23 and the slide 11, and the adhesive is relatively far removed from the viewing chamber. Thus, should the specimen fill the overflow chamber 29 and be in contact with the flange 23 the specimen would still not contact the adhesive 15.

Figure 3:
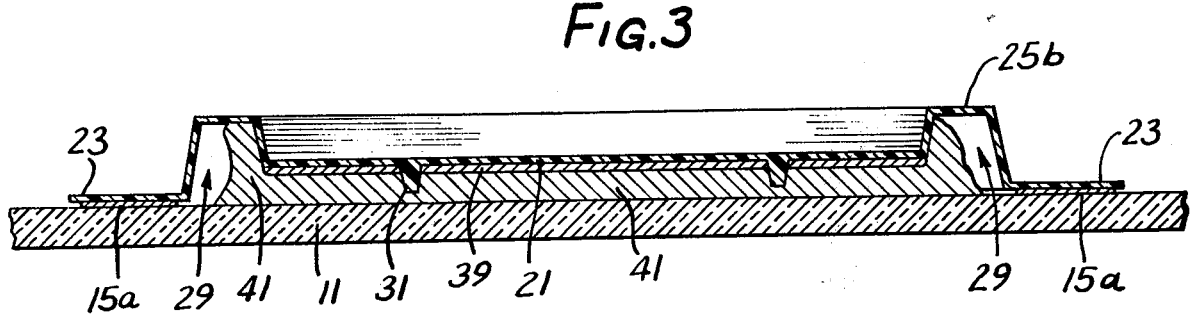

In an alternate embodiment, as seen in FIG. 3, a ring of adhesive 15a is provided between the slide 11 and the flange 23. In this embodiment the hold-down sheet 17 is not used and the flange 23 of cover slip 13 is directly adhesively secured to the slide 11. The adhesive ring 15a may be initially applied to either the surface of the flange 23 adjacent the slide 11 or to the surface of the slide 11 itself. In either embodiment a microscope slide may be quickly and easily prepared having the cover slip very firmly secured to the slide and providing an airtight viewing chamber.

If, in a particular application, an airtight viewing chamber is not needed it may be sufficient to provide only enough adhesive to firmly attach the cover slip to the slide. In such an application adhesive need only to be placed between the slide 11 and each of either two opposed outermost margin portions 37 or two opposed flange portions 23. With two opposed ends of the cover slip 13 attached to the slide 11 the cover slip is sufficiently secured that the microscope slide is satisfactorily functional.

The embodiment depicted in FIG. 3 is shown with a reagent coating 39 applied to the surface of the panel 21 adjacent the slide 11. Cover slips having such reagent coatings may be prepared well in advance of use, the coated cover slips being protectively packaged and stored until needed.

Referring to FIG. 3, the operation of the overflow chamber 29 is graphically demonstrated. A specimen 41 has been placed in the space between the panel 21 and the slide 11. The panel 21 has been squeezed toward the slide 11 to spread out the specimen 41 to allow the specimen to be better viewed through the microscope. Although an excessive amount of specimen was utilized, it did not spread out to break the airtight seal between the flange 23 and the slide 11 but rather is contained within the overflow chamber 29.

The specimen 41, as it is extruded out from between the panel 21 and the slide 11 is under very little fluid pressure. The specimen must first fill the overflow chamber 29 before any appreciable fluid pressure can be developed in the specimen 41. Until a fluid pressure is developed which is capable of separating the flange 23 from the slide 11 the airtight seal will not be broken by the specimen. In the illustrated embodiment the volume of the overflow chamber 29 is nearly double the volume of the specimen chamber. As the object is to merely fill, or approximately fill, the specimen chamber, the person preparing the slide, would have to use three times as much specimen as he was supposed to before the airtight seal would be broken by the specimen when the panel 21 is pressed toward the slide 11.

One of the more difficult aspects of preparing a cover slip slide is insuring that the specimen is squeezed into a very thin, uniform thickness. This thickness is desired for optimum viewing by a high power microscope which characteristically has a very short focal length. When preparing a slide using the illustrated embodiment of the present invention the panel 21 is flexed toward the slide 11 until the posts 31 come into contact with the slide surface. As the posts 31 keep the panel 21 the desired distance from the slide 11, this intrinsically gives the desired thickness to the specimen.

As nothing need be done to the slide 11 prior to placing on it the specimen 41, keeping the slide 11 sterile is a much easier task. Further, contamination of the specimen 41 by the adhesive 15 is no longer a serious problem as the adhesive is remote from the viewing chamber. If the specimen were to contact the adhesive and become contaminated, the contaminated portion of the specimen would most probably remain in the overflow chamber 29 leaving that portion of the specimen within the specimen chamber uncontaminated.

The adhesive 15 may be of any suitable type which would allow the cover slip and the slide to be adhesively joined together forming an airtight seal. It is desirable, however, to use an adhesive that is chemically inert to the specimen and to any reagent that might be used, and in the preferred embodiment an adhesive is used that possesses characteristics similar to that of the adhesive used for surgical tape.

The illustrated embodiment is not limited to a particular form of microscope slide preparation. If another form of microscope slide was desired, for example a hanging drop slide, the illustrated embodiment is equally efficacious. To prepare a hanging drop slide one would place a drop of the specimen centrally between the posts 31 of an inverted cover slip 13. The cover slip 13 would then be turned over and placed on and secured to the slide 11 as previously described. The posts 31 will insure that the drop of specimen does not touch the surface of the slide 11 and the hanging drop is within an airtight viewing chamber.

Thus, the present invention provides a microscopic slide having an airtight viewing chamber which may be quickly and easily prepared with the possibility of error minimized.

While certain embodiments of the invention have been shown and described it should be apparent that various modifications may be made therein without departing from the scope of the invention, various features of which are pointed out in the following claims.

What is claimed is:

1. A cover slip for a microscope slide, comprising: a transparent panel; a flange projecting from the periphery of said panel adapted to overlie the surface of a microscope slide with said panel being in spaced relation to the slide surface, said panel being capable of selective flexing toward said slide surface when said flange is secured on said slide surface; means for securing said flange to the surface of the slide; means intermediate said panel and said flange defining an overflow chamber peripherally of said panel; and a post extending perpendicularly from the surface of said panel to have its free end adjacent but spaced from the slide surface when said panel is in a normal unflexed position on the slide surface, said post having a predetermined longitudinal length such that said panel may be flexed toward said slide surface to cause said free end of said post to engage said slide surface and establish a predetermined thickness for a specimen disposed on said slide surface in underlying relation to said panel, said panel being substantially planar and said overflow chamber being defined by a wall extending around the periphery of said panel, said wall being comprised of a first wall member extending generally perpendicularly upward from the periphery of said panel, a second wall member extending from the uppermost portion of said first wall member generally parallel to the surface of said panel and a third wall member joining said second wall member to said flange.

2. The cover slip of claim 1 wherein the means for securing said flange to the surface of the slide includes a sheet adapted to be superimposed over said cover slip, said sheet having a generally centrally located aperture, the sheet margin surrounding said aperture being adapted to overlay said flange and at least two opposed portions of said margin being adapted to extend beyond said flange to overlay the slide when said sheet is superimposed over said cover slip, and adhesive means disposed between said margin portions adapted to overlay the slide and the slide whereby said sheet may be adhesively fixed to the slide capturing said flange between said sheet and the slide.

* * * * *